United States Patent [19]
Osborn et al.

[11] Patent Number: 6,034,870
[45] Date of Patent: Mar. 7, 2000

[54] COMPUTER SYSTEM HAVING A HIGHLY EFFICIENT FORCED AIR COOLING SUBSYSTEM

[75] Inventors: Jay K. Osborn, Alameda; Howard W. Stolz, Soquel; Clifford B. Willis, Tracy, all of Calif.

[73] Assignee: Sun Microsystems, Inc., Palo Alto, Calif.

[21] Appl. No.: 09/238,867

[22] Filed: Jan. 27, 1999

[51] Int. Cl.⁷ ....................................................... H05K 7/20
[52] U.S. Cl. .......................... 361/690; 361/687; 361/695; 361/697; 361/715; 312/236; 174/15.1; 174/16.1; 165/121; 165/146; 454/184; 62/259.2; 62/404; 62/407
[58] Field of Search ..................... 361/683, 664, 361/684–697, 726, 732, 784, 790, 801, 802, 715; 312/223.2, 107, 111, 257.1, 236, 323.3, 298; 165/80.2, 80.3, 104.32, 104.33, 165, 185, 47; 415/213.1, 119; 62/259.2, 404, 407, 419; 484/184; 257/712, 713, 722, 721; 174/16.1, 16.2

[56] References Cited

U.S. PATENT DOCUMENTS

| | | | |
|---|---|---|---|
| 4,643,245 | 2/1987 | Smoot et al. | 165/47 |
| 5,446,619 | 8/1995 | Madsen et al. | 361/695 |
| 5,473,507 | 12/1995 | Schwegler et al. | 361/690 |
| 5,505,533 | 4/1996 | Kammersquard et al. | 312/236 |
| 5,586,865 | 12/1996 | Yin | 415/213.1 |
| 5,600,538 | 2/1997 | Xanthopoulos | 361/683 |
| 5,701,231 | 12/1997 | Do et al. | 361/683 |

OTHER PUBLICATIONS

*NLX Thermal Design Suggestions*, Intel Corporation, copyright 1997.
*ATX Specification*, Intel Corporation, copyright 1996, 1997, 1998.
*microATX Chassis Design Suggestions*, Intel Corporation, copyright 1998.
*Low Profile Fan Duct Design Guidelines*, Intel Corporation, copyright 1998.

*Primary Examiner*—Leo P. Picard
*Assistant Examiner*—Michael Datskovsky
*Attorney, Agent, or Firm*—Conley, Rose & Tayon, PC; B. Noel Kivlin

[57] ABSTRACT

A computer system including a highly efficient forced air cooling subsystem is disclosed. The computer system includes an enclosure having a first (e.g., front) panel, a processor mounted upon a motherboard located within the enclosure, and a fan located within the enclosure for providing a flow of air through the enclosure. The fan draws air into the enclosure through an opening (e.g., an intake vent) in the first panel and produces a pressurized stream of air. The fan may be oriented such that the pressurized stream of air is directed toward the processor. The computer system may also include a plenum adjacent to the first panel, wherein the intake vent allows ambient air surrounding the enclosure to enter the plenum. The fan may be mounted within an opening in a wall of the plenum. The enclosure may also include a second (e.g., rear) panel opposed to the first (e.g., front) panel and having three openings (e.g., exhaust vents) therein. A first portion of the pressurized stream of air may flow across the processor and exit through a first exhaust vent. A second portion of the pressurized stream of air may flow through a power supply located within the enclosure and exit through a second exhaust vent. A third portion of the pressurized stream of air may flow through a space within the enclosure reserved for option cards and exit the enclosure through a third exhaust vent.

27 Claims, 4 Drawing Sheets

COMPUTER SYSTEM HAVING A HIGHLY EFFICIENT FORCED AIR COOLING SUBSYSTEM

BACKGROUND OF THE INVENTION

1. Field of the Invention

This invention relates to computer systems, and particularly to computer systems having one or more fans located within an enclosure for providing forced air cooling of components located within the enclosure.

2. Description of the Related Art

A typical computer system includes multiple electronic components, including a central processing unit or "processor", positioned within an enclosure. During operation, such electronic components dissipate electrical power (i.e., transform electrical energy into heat energy). At the same time, several key operating parameters of semiconductor electronic devices typically vary with temperature, and reliable device operation within specifications occurs only within a defined operating temperature range. For example, specified performance of a processor is typically achieved only when the temperature of the processor is maintained below a specified maximum operating temperature. Operation of the processor at a temperature above the maximum operating temperature may result in irreversible damage to the processor. In addition, it has been established that the reliabilities of semiconductor electronic devices decrease with increasing operating temperature.

The heat energy produced by electronic components during operation must thus be removed to a surrounding ambient at a rate which ensures operational and reliability requirements are met. As component speeds and capabilities increase, so does the amount of electrical power dissipated by the components during operation. Cooling mechanisms employed by computer systems must thus transfer more heat energy from the computer system enclosure to the surrounding ambient.

Today, a typical computer system includes at least two fans located within the enclosure. A first fan is typically located within a power supply unit which supplies electrical power to other system components. The first fan exhausts air within the enclosure through an opening in a rear panel of the enclosure. The resulting vacuum created within the enclosure causes ambient air surrounding the enclosure to be drawn into the enclosure through various openings in the enclosure. The air entering the enclosure flows over the components within the enclosure, absorbing heat energy from the components before being expelled through the rear panel by the fan. A second fan is attached to a heat sink mounted to the processor. The second fan circulates air through the heat sink, and is dedicated to cooling the processor.

Fans are rotating electromechanical devices which produce acoustic noise and fail relatively often (i.e., have relatively short lives). When a fan fails, the components which rely on cooling air provided by the fan can, and often do, fail as well. It would thus be desirable to have a computer system which provides adequate component cooling with a minimum number of fans.

SUMMARY OF THE INVENTION

The problems outlined above are in large part solved by a computer system having a highly efficient forced air cooling subsystem. The computer system includes an enclosure having a first (e.g., front) panel, a processor mounted upon a motherboard located within the enclosure, and a fan located within the enclosure for providing a flow of air through the enclosure. The fan draws air into the enclosure through an opening (e.g., an intake vent) in the first panel and produces a pressurized stream of air. The fan may be oriented such that the pressurized stream of air is directed toward the processor. A first portion of the pressurized stream of air may flow across the processor, and a second portion of the pressurized stream of air may flow through a power supply located within the enclosure.

The computer system may also include a plenum adjacent to the first panel, wherein the intake vent allows ambient air surrounding the enclosure to enter the plenum. The fan may be mounted within an opening in a wall of the plenum. The computer system may also include a filter positioned between the intake vent and the plenum for filtering the ambient air drawn into the plenum. The enclosure may also include a second (e.g., rear) panel opposed to the first (e.g., front) panel and having one or more openings (e.g., exhaust vents) extending through the second panel. The pressurized stream of air produced by the fan may exit the enclosure through the exhaust vents. The fan, the processor, and one of the exhaust vents may be substantially aligned with one another. The intake vent may include multiple closely-spaced openings or holes aligned with one another. Each exhaust vent may include a two-dimensional array of openings or holes.

The second panel may have a total of three exhaust vents. The fan, the processor, and a first of the three exhaust vents may be substantially aligned with one another. The processor may have a heat sink mounted thereupon. The heat sink may include multiple heat transfer structures (e.g., pins) extending into the pressurized stream of air. The first portion of the pressurized stream of air may flow across the heat sink and exit the enclosure through the first exhaust vent.

The power supply may include a power supply enclosure having a top panel with multiple holes therein and a rear panel. The rear panel of the power supply enclosure may form a portion of the rear panel of the computer system enclosure, and the second of the three exhaust vents may be located within the rear panel of the power supply enclosure. The second portion of the pressurized stream of air may flow through the power supply, entering the power supply enclosure through the multiple holes in the top panel and exiting the power supply enclosure through the second exhaust vent.

A space within the enclosure and adjacent to a third of the three exhaust vents may be reserved for connecting option cards to the motherboard. A third portion of the pressurized stream of air may flow through the space and exit the enclosure through the third exhaust vent. The motherboard may include a riser card having one or more connectors for connecting to an option card. The riser card may extend into the pressurized stream of air, diverting the third portion from the pressurized stream of air.

The motherboard may include one or more electrical connectors located adjacent to the processor and extending into the pressurized stream of air. The connectors may be oriented such that they are longitudinally aligned with the direction of the first portion of the pressurized stream of air. As a result, deflection of the first portion of the pressurized stream of air by the connectors, and the resulting resistance to flow of the first portion, are minimized.

BRIEF DESCRIPTION OF THE DRAWINGS

Other objects and advantages of the invention will become apparent upon reading the following detailed description and upon reference to the accompanying drawings in which:

FIG. 3 is a top plan view of the enclosure of FIG. 1 with a top panel removed, wherein FIG. 3 illustrates air flows through the enclosure produced by a fan.

Figure 1:
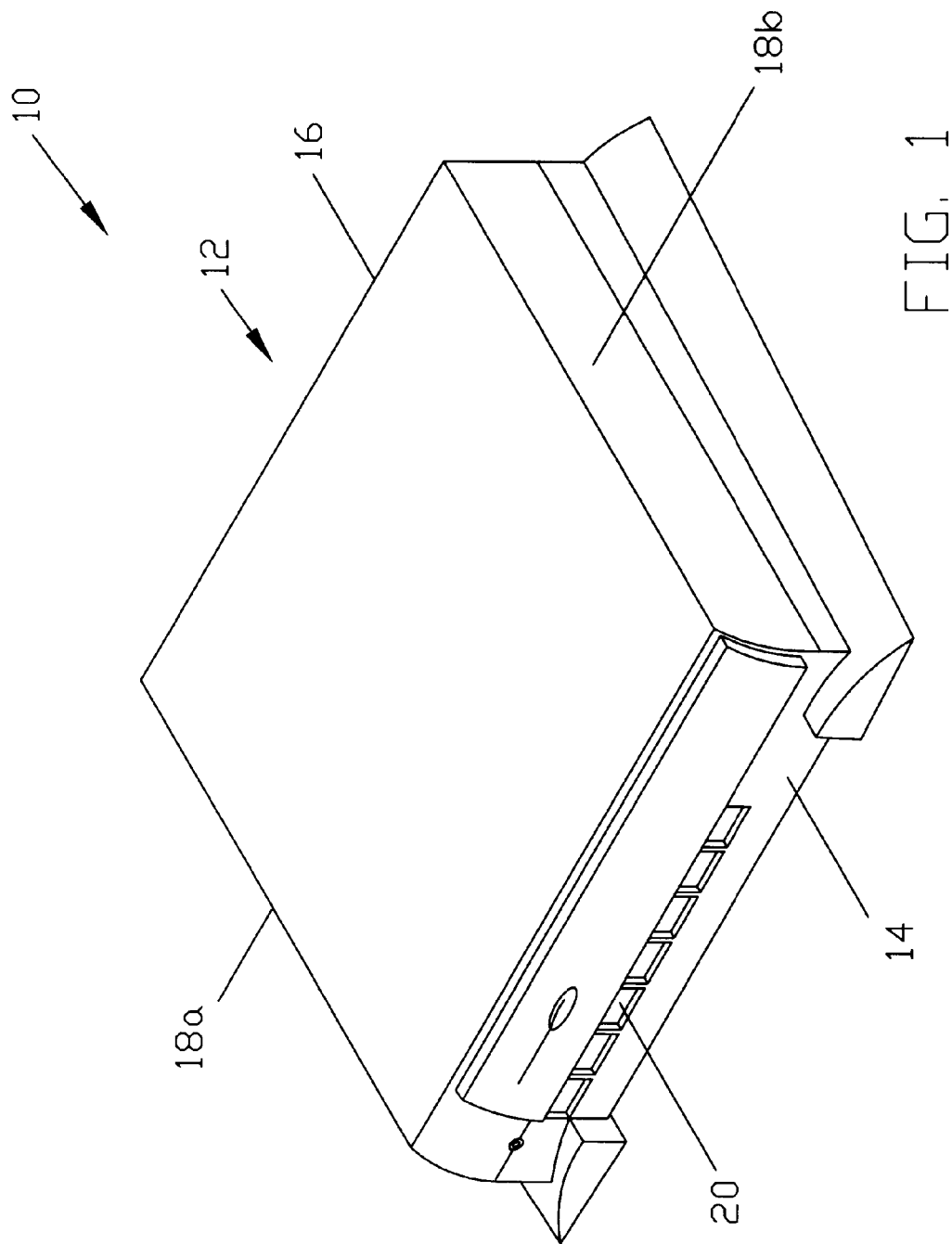
FIG. 1 is a perspective view of one embodiment of a computer system in accordance with the present invention, wherein the computer system includes a motherboard located within an enclosure, and wherein the enclosure includes a front panel having an opening therethrough forming an air intake vent.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

FIG. 1 is a perspective view of one embodiment of a computer system 10 in accordance with the present invention. Computer system 10 includes an enclosure 12 which houses other components of computer system 10. Enclosure 12 includes a front panel 14, a rear panel 16 opposed to front panel 14, and two opposed side panels 18a and 18b. Front panel 14 has an opening therethrough forming an intake vent 20 through which air may flow. In the embodiment of FIG. 1, intake vent 20 includes multiple openings or holes arranged linearly in an unobtrusive and aesthetically pleasing manner. The total area of the multiple openings of intake vent 20 is sufficient to provide a desired flow rate of air into an interior portion of enclosure 12.

Figure 2:
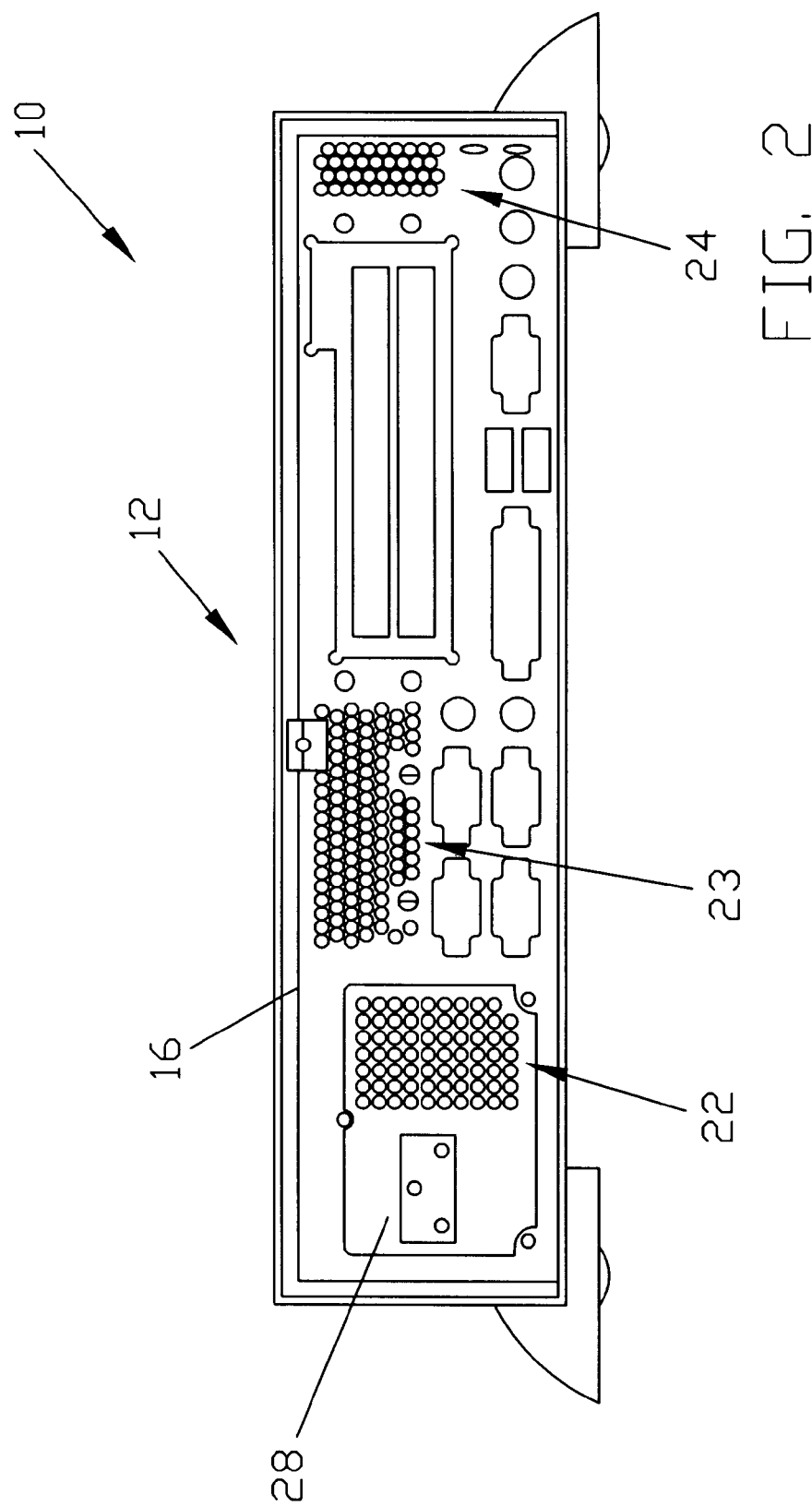
FIG. 2 is a side elevation view of a rear panel of the enclosure of FIG. 1, wherein the rear panel has three openings therethrough forming air exhaust vents.

FIG. 2 is a side elevation view of rear panel 16 of enclosure 12. Rear panel 16 has three open regions therethrough forming exhaust vents 22–24 through which air may flow. Each exhaust vent 22–24 includes multiple openings or holes arranged as a two-dimensional array. The total area of the multiple openings of exhaust vents 22–24 may be selected to provide a desired flow rate of air through the interior portion of enclosure 12. As will be described in more detail below, the amount of air flowing through each exhaust vent 22–24, and also through adjacent regions of the interior portion of enclosure 12, may be controlled by appropriately selecting the total area of the multiple openings of each exhaust vent 22–24. In the embodiment of FIG. 2, exhaust vent 22 is formed in a rear panel 28 of a power supply located within enclosure 12. Rear panel 28 of the power supply forms a portion of rear panel 16 of enclosure 12 as shown in FIG. 2.

Figure 3:
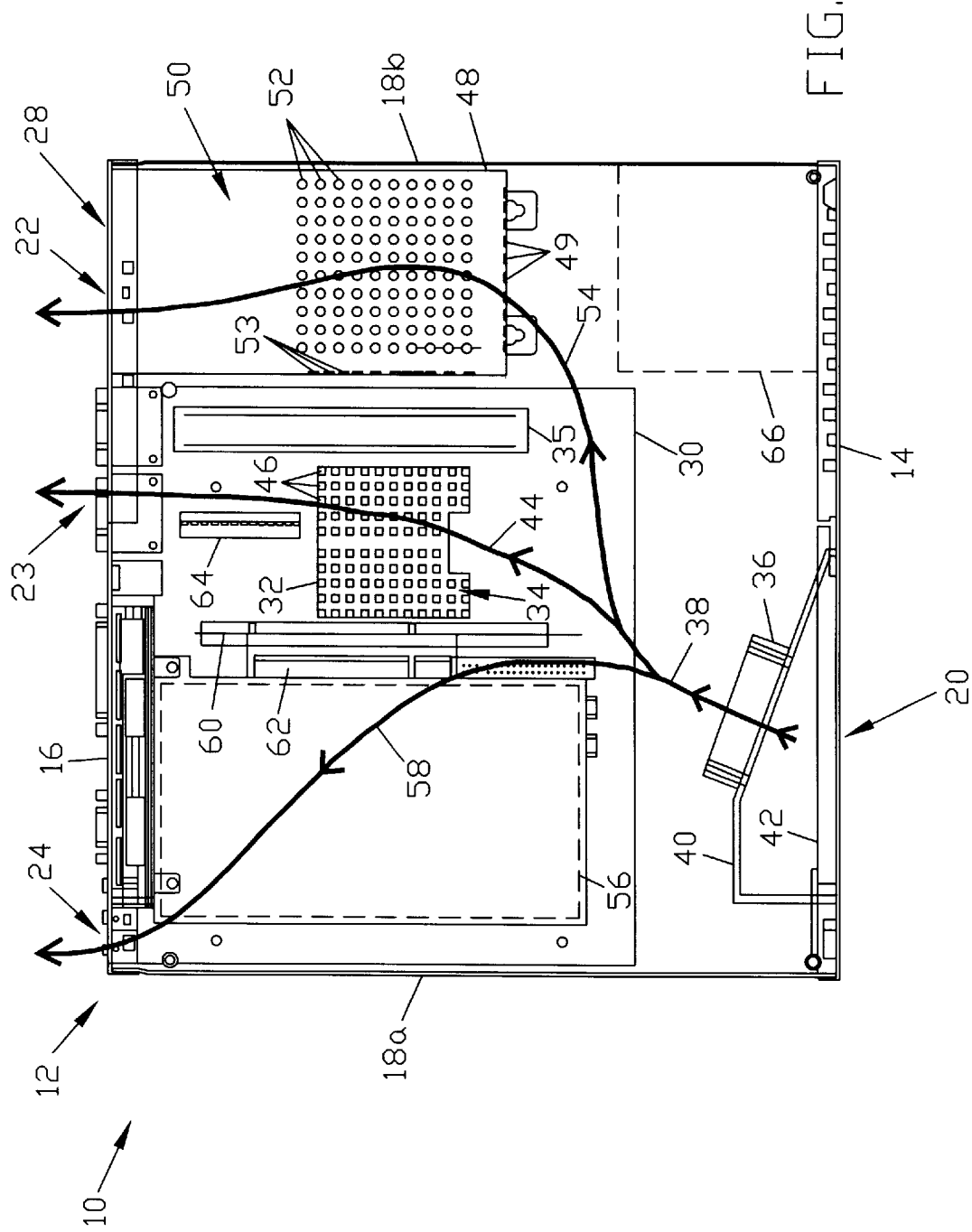

FIG. 3 is a top plan view of enclosure 12 with a top panel removed. Computer system 10 includes a motherboard 30 located within enclosure 12. Motherboard 30 has a processor 32 mounted upon an upper surface of motherboard 30. Processor 32 has a heat sink 34 mounted upon an upper surface of processor 32.

Computer system 10 includes a fan 36 for providing a flow of air through enclosure 12. Fan 36 is mounted within an opening in a wall of a plenum 40 extending between intake vent 20 and fan 36. Plenum 40 is located adjacent to front panel 14 such that intake vent 20 allows ambient air surrounding enclosure 12 to enter plenum 40. During operation, fan 36 draws air from the surrounding ambient into the interior of enclosure 12 through intake vent 20 and plenum 40. Interior surfaces of plenum 40 may be oriented to direct air entering intake vent 20 to an input side of fan 36, and may be made smooth in order to reduce air flow restrictions. Plenum 40 forms an interface between intake vent 20 and the input side of fan 36, allowing dimensions of intake vent 20 to exceed those of the input side of fan 36. In general, the greater the ratio between the area of intake vent 20 and the area of the input side of fan 36, the less restriction to air flow offered by intake vent 20. Plenum 40 prevents recirculation of air through fan 36, and also serves to reduce the amount of acoustic noise produced by fan 36 which exits intake vent 20. A filter 42 may be positioned between intake vent 20 and plenum 40 to filter the ambient air before it enters plenum 40.

Fan 36 produces a pressurized stream of air 38 at an output side. Pressurized stream of air 38 flows through enclosure 12 and exits enclosure 12 through exhaust vents 22–24 in rear panel 16. As shown in FIG. 3, fan 36 is oriented such that pressurized stream of air 38 produced by fan 36 is directed toward processor 32.

Fan 36 may be the only fan within enclosure 12 of computer system 10. This configuration is highly desirable in that fans are rotating electromechanical devices which produce acoustic noise and have relatively short lives. By employing a single fan, manufacturing costs of computer system 10 may also be reduced. Fan 36 may be an axial fan adequately sized to deliver a desired rate of air flow through enclosure 12.

Fan 36, processor 32, and exhaust vent 23 are substantially aligned with one another as shown in FIG. 3. A first portion 44 of pressurized stream of air 38 flows across processor 32 and heat sink 34, and exits enclosure 12 through exhaust vent 23. Components mounted to the motherboard have been arranged to create a "duct" to channel first portion 44 across processor 32 and heat sink 34. The walls of the duct are formed by the upper surface of motherboard 30, a vertically-extending riser card 60, the top panel of enclosure 12, a memory module socket 35, and a side panel of a power supply 48. Riser card 60 is positioned on one side of processor 32, and memory module socket 35 and power supply 48 are positioned on an opposite side of processor 32. Riser card 60, memory module socket 35, and power supply 48 are oriented to channel first portion 44 flows across processor 32 and heat sink 34. As shown in FIG. 3, riser card 60 and memory module socket 35 are substantially longitudinally aligned with the direction of first portion 44.

Heat sink 34 includes multiple heat transfer structures 46 extending into first portion 44 of pressurized stream of air 38. In the embodiment of FIG. 3, heat transfer structures 46 are pins arranged in a two-dimensional array and extending in parallel into first portion 44 of pressurized stream of air 38. The pins may extend a majority of a vertical height of enclosure 12. Heat sink 34 may substantially fill the duct described above, thus minimizing the amount of first portion 44 which goes around (i.e., bypasses) heat sink 34 rather than through heat sink 34. Heat transfer structures 46 may also be, for example, longitudinal fins oriented to allow first portion 44 of pressurized stream of air 38 to flow therebetween. The relative size of first portion 44 of pressurized stream of air 38 may be controlled by selecting the total area of the multiple openings of exhaust vent 23, the orientation of fan 36, and the location of riser card 60.

Power supply 48 is located within enclosure 12 as shown in FIG. 3. Power supply 48 supplies electrical power to components of computer system 10. Power supply 48 includes a power supply enclosure, and the power supply enclosure includes rear panel 28. Exhaust vent 22 is located within rear panel 28 of the power supply enclosure. As described above, rear panel 28 of the power supply enclosure forms a portion of rear panel 16 of enclosure 12, thus exhaust vent 22 is also located within rear panel 16 of enclosure 12.

The power supply enclosure has multiple openings or holes in a front portion opposite rear panel 28. A front panel opposite rear panel 28 has multiple openings or holes 49 extending therethrough, a top panel 50 of the power supply enclosure has multiple openings or holes 52 extending therethrough, and a side panel facing memory module socket 35 has multiple openings or holes 53 extending therethrough. The total area of the multiple openings 49, 52, and 53 is sufficient to provide a desired flow rate of air into an interior portion of the power supply enclosure. A second portion 54 of pressurized stream of air 38 flows through power supply 48, absorbing heat energy from components of power supply 48 within the power supply enclosure before exiting enclosure 12 through exhaust vent 22. This air flow direction is advantageous as unheated air (i.e., air not preheated by other system components) enters power supply 48, and heated air exiting power supply 48 is expelled from enclosure 12. Second portion 54 of pressurized stream of air 38 enters the power supply enclosure through the holes in the front and side panels, as well as the multiple holes 52 in top panel 50, and exits the power supply enclosure through exhaust vent 22 in rear panel 28 of the power supply enclosure. The relative size of second portion 54 of pressurized stream of air 38 may be controlled by selecting the total area of the multiple openings of exhaust vent 22 and/or the total area of the multiple openings 49, 52, and 53 in the power supply enclosure.

A space 56 within the interior of enclosure 12 is reserved for connecting option cards to motherboard 30. Options cards may be, for example, cards configured for signal transfer via the peripheral component interconnect (PCI) protocol. Space 56 is adjacent to exhaust vent 24, and a third portion 58 of pressurized stream of air 38 flows through space 56 before exiting enclosure 12 through exhaust vent 24. Motherboard 30 includes riser card 60, and riser card 60 includes one or more connectors 62 adapted for connecting to one or more option cards (not shown). Riser card 60 extends vertically into pressurized stream of air 38, diverting third portion 58 from pressurized stream of air 38. The option cards may be oriented substantially parallel to motherboard 30 to minimize the required dimensions of enclosure 12 and to facilitate cooling via third portion 58 from pressurized stream of air 38. The relative size of third portion 58 may be controlled by selecting the total area of the multiple openings of exhaust vent 24 and/or the orientation of fan 36 and/or the location and orientation of riser acrd 60. It is noted that the total areas of the multiple openings of exhaust vents 22 and 23, associated with power supply 48 and processor 32 respectively, are much larger than the multiple openings of exhaust vent 24 associate with space 56. For example, in one embodiment, the total area of the multiple openings of exhaust vent 23 is between two and three times that of exhaust vent 24.

Figure 4:
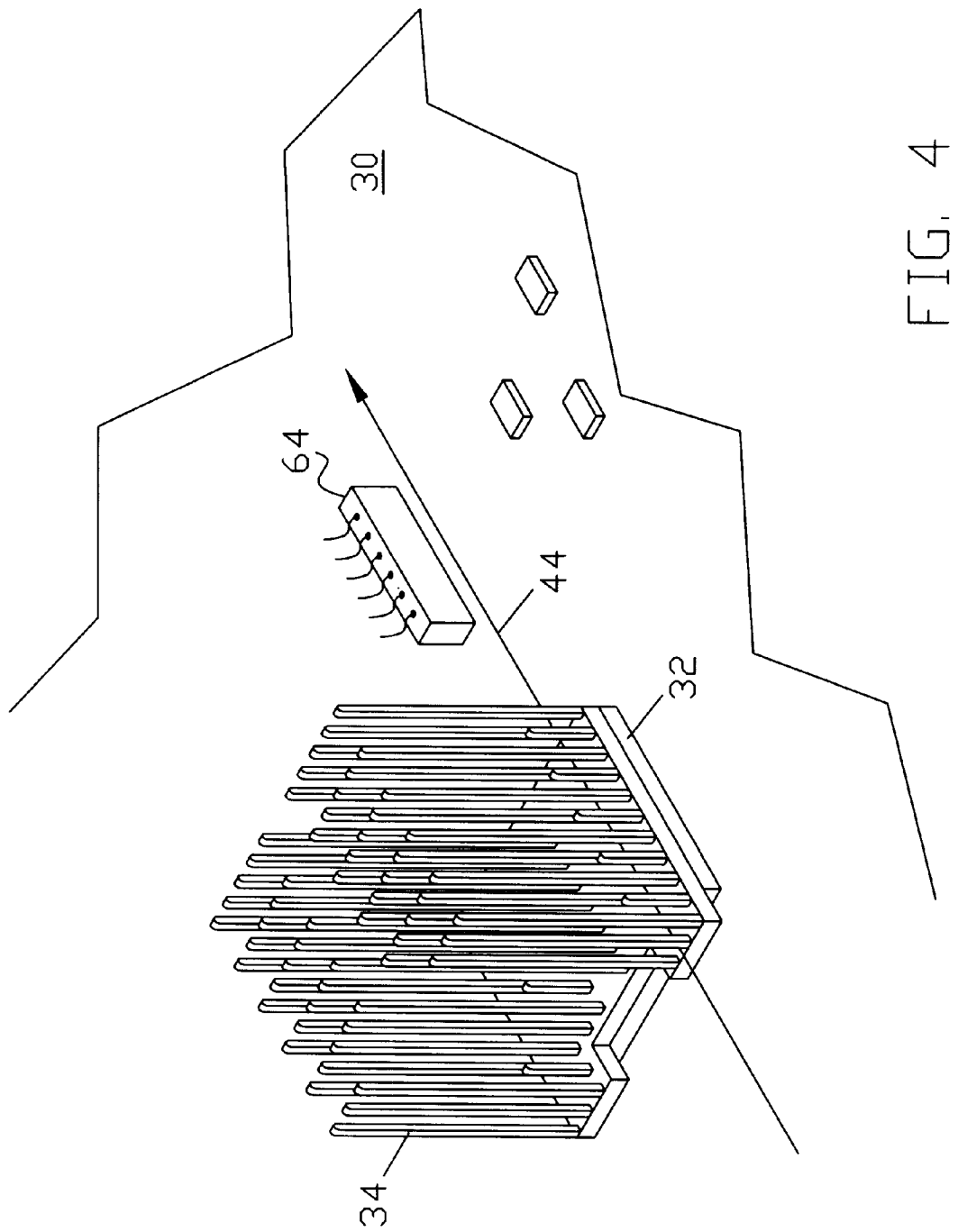
FIG. 4 is a perspective view of an electrical connector mounted upon an upper surface of the motherboard, wherein the electrical connector is oriented such that the electrical connector is longitudinally aligned with a portion of a pressurized stream of air produced by the fan.

Motherboard 30 may include an electrical connector 64 located adjacent to processor 32 and extending into first portion 44 of pressurized stream of air 38. The orientation of electrical connector 64 may be selected to minimize deflection of first portion 44 of pressurized stream of air 38. This may be achieved by longitudinally aligning the elongated faces of electrical connector 64 with the direction of first portion 44 of pressurized stream of air 38 as shown in FIG. 3. FIG. 4 is a perspective view of electrical connector 64 mounted upon the upper surface of motherboard 30, wherein electrical connector 64 is oriented such that electrical connector 64 is longitudinally aligned with first portion 44 of pressurized stream of air 38. In one embodiment, any additional connectors (not shown) extending into first portion 44 of pressurized stream of air 38 are similarly oriented in this manner.

It is noted that a gap is formed between riser card 60 and rear panel 16 of enclosure 12 to allow a part of portion 44 to join portion 58 before exiting exhaust vent 24. This part of portion 44 cools components along a rear edge of motherboard 30, eliminating an air flow "dead spot" within enclosure 12.

An area 66 within enclosure 12 and adjacent to front panel 14 may be reserved for one or more disk drives. Testing has shown that air flow within enclosure 12 will adequately cool disk drives located in area 66.

Numerous variations and modifications will become apparent to those skilled in the art once the above disclosure is fully appreciated. It is intended that the following claims be interpreted to embrace all such variations and modifications.

What is claimed is:

1. A computer system, comprising:
   an enclosure having opposed first and second panels, wherein the second panel has a first exhaust vent and a second exhaust vent extending therethrough, and wherein the first and second exhaust vents are laterally displaced from one another;
   a processor mounted upon a motherboard located within the enclosure;
   a fan located within the enclosure for providing a flow of air through the enclosure, wherein the fan draws air into the enclosure through an opening in the first panel and produces a pressurized stream of air, and wherein the fan is oriented such that the pressurized stream of air is directed toward the processor; and
   wherein a first portion of the pressurized stream of air flows across the processor and exits the enclosure through the first exhaust vent, and wherein a second portion of the pressurized stream of air flows through a power supply located within the enclosure and exits the enclosure through the second exhaust vent.

2. The computer system as recited in claim 1, wherein the enclosure further comprises a plenum adjacent to the first panel, wherein the opening in the first panel allows ambient air surrounding the enclosure to enter the plenum.

3. The computer system as recited in claim 2, wherein the fan is mounted within an opening in a wall of the plenum.

4. The computer system as recited in claim 1, wherein the processor and the first exhaust vent are substantially located along a linear direction of the pressurized stream of air exiting the fan.

5. A computer system, comprising:
   an enclosure having opposed first and second panels, the first panel having an intake vent extending therethrough and the second panel having a first exhaust vent and a second exhaust vent extending therethrough, and wherein the first and second exhaust vents are laterally displaced from one another;

a motherboard located within the enclosure and having a processor mounted thereupon;

a plenum located within the enclosure adjacent to the first panel, wherein the intake vent allows ambient air surrounding the enclosure to enter the plenum, a fan located within the enclosure for providing a flow of air through the enclosure, wherein the fan is mounted within an opening in a wall of the plenum, and wherein the fan draws air from the plenum and produces a pressurized stream of air, and wherein the fan is oriented such that the pressurized stream of air is directed toward the processor; and wherein a first portion of the pressurized stream of air flows across the processor and exits the enclosure through the first exhaust vent, and wherein a second portion of the pressurized stream of air flows through a power supply located within the enclosure and exits the enclosure through the second exhaust vent.

6. The computer system as recited in claim 5, wherein the intake vent comprises a linearly arranged plurality of openings.

7. The computer system as recited in claim 5, wherein each of the first and second exhaust vents comprises a two-dimensional array of openings.

8. The computer system as recited in claim 5, wherein the second panel further comprises a third exhaust vent extending therethrough, wherein the first, second, and third exhaust vents are laterally displaced from one another.

9. The computer system as recited in claim 5, wherein the processor and the first exhaust vent are substantially located along a linear direction of the pressurized stream of air exiting the fan.

10. The computer system as recited in claim 5, wherein the processor has a heat sink mounted thereupon, and wherein the heat sink comprises a plurality of heat transfer structures extending into the first portion of the pressurized stream of air.

11. The computer system as recited in claim 10, wherein the plurality of heat transfer structures comprises pins arranged in a two-dimensional array and extending in parallel into the first portion of the pressurized stream of air.

12. The computer system as recited in claim 10, wherein the first portion of the pressurized stream of air flows across the processor and heat sink and exits the enclosure through the first exhaust vent.

13. The computer system as recited in claim 5, wherein the power supply comprises a power supply enclosure having a rear panel, and wherein the rear panel of the power supply enclosure forms a portion of the second panel of the enclosure, and wherein the second exhaust vent is located within the rear panel of the power supply enclosure.

14. The computer system as recited in claim 13, wherein the power supply enclosure further comprises a top panel having at least one opening extending therethrough, and wherein the second portion of the pressurized stream of air flowing through the power supply enters the power supply enclosure through the at least one opening in the top panel and exits the power supply enclosure through the second exhaust vent.

15. The computer system as recited in claim 8, wherein a space within the enclosure is reserved for connecting option cards to the motherboard, and wherein the space is adjacent to the third exhaust vent, and wherein a third portion of the pressurized stream of air flows through the space reserved for connecting option cards and exits the enclosure through the third exhaust vent.

16. The computer system as recited in claim 15, wherein the motherboard further comprises a riser card having at least one connector adapted for connecting to an option card, and wherein the riser card extends into the pressurized stream of air and diverts the third portion of the pressurized stream of air which flows through the space reserved for option cards and exits the enclosure through the third exhaust vent.

17. The computer system as recited in claim 5, wherein the motherboard comprises an electrical connector located adjacent to the processor and extending into the pressurized stream of air, wherein the orientation of the connector is selected to minimize deflection of the pressurized stream of air.

18. The computer system as recited in claim 5, further comprising a filter positioned between the intake vent and the plenum for filtering the ambient air drawn into the plenum.

19. The computer system as recited in claim 5, wherein the fan is the only fan located within the enclosure for providing a flow of air through the enclosure.

20. The computer system as recited in claim 5, wherein the first panel is a front panel, and wherein the second panel is a rear panel.

21. The computer system as recited in claim 12, wherein the processor is flanked by a riser card on one side and a memory module socket and a power supply on an opposite side, and wherein the riser card, the memory module socket, and the power supply are oriented to channel the first portion of the pressurized stream of air flowing across the processor and heat sink.

22. A computer system, comprising:

an enclosure having opposed front and back panels, the front panel having an intake vent extending therethrough and the back panel having a first exhaust vent, a second exhaust vent, and a third exhaust vent extending therethrough, and wherein the first, second, and third exhaust vents are laterally displaced from one another;

a motherboard located within the enclosure and having a processor mounted thereupon; and a plenum located within the enclosure adjacent to the first panel, wherein the intake vent allows ambient air surrounding the enclosure to enter the plenum;

a fan located within the enclosure for providing a flow of air through the enclosure, wherein the fan is mounted within an opening in a wall of the plenum, and wherein the fan draws air from the plenum and produces a pressurized stream of air, and wherein the fan is oriented such that the pressurized stream of air is directed toward the processor;

wherein a first portion of the pressurized stream of air flows across the processor and exits the enclosure through the first exhaust vent, and wherein a second portion of the pressurized stream of air flows through a power supply located within the enclosure and exits the enclosure through the second exhaust vent; and wherein a space within the enclosure is reserved for connecting option cards to the motherboard, and wherein the space is adjacent to the third exhaust vent, and wherein a third portion of the pressurized stream of air flows through the space reserved for connecting option cards and exits the enclosure through the third exhaust vent.

23. The computer system as recited in claim 22, wherein the processor and the first exhaust vent are substantially located along a linear direction of the pressurized stream of air exiting the fan.

24. The computer system as recited in claim 22, wherein the processor has a heat sink mounted thereupon, and wherein the heat sink comprises a plurality of heat transfer structures extending into the first portion of the pressurized stream of air.

25. The computer system as recited in claim 22, wherein the power supply comprises a power supply enclosure including:
- a rear panel, wherein the rear panel of the power supply enclosure forms a portion of the second panel of the enclosure, and wherein the second exhaust vent is located within the rear panel of the power supply enclosure;
- a top panel having at least one opening extending therethrough; and
- wherein the second portion of the pressurized stream of air flowing through the power supply enters the power supply enclosure through the at least one opening in the top panel and exits the power supply enclosure through the second exhaust vent.

26. The computer system as recited in claim 22, wherein the motherboard further comprises a riser card having at least one connector adapted for connecting to an option card, and wherein the riser card extends into the pressurized stream of air and diverts the third portion of the pressurized stream of air which flows through the space reserved for option cards and exits the enclosure through the third exhaust vent.

27. The computer system as recited in claim 24, wherein the processor is flanked by a riser card on one side and a memory module socket and a power supply on an opposite side, and wherein the riser card, the memory module socket, and the power supply are oriented to channel the first portion of the pressurized stream of air flowing across the processor and heat sink.

* * * * *